United States Patent Office 2,775,578
Patented Dec. 25, 1956

2,775,578

POLYMERIZATIONS INITIATED BY SATURATED CYCLIC TERPENE PEROXIDES

Gordon S. Fisher, Lake City, Fla., and Leo A. Goldblatt, New Orleans, La., assignors to the United States of America as represented by the Secretary of Agriculture No Drawing. Application March 22, 1955,
Serial No. 496,085

13 Claims. (Cl. 260—84.1)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the polymerization of unsaturated organic compounds. More particularly, the invention provides an improved process of producing rubber-like elastomeric polymers by a low temperature aqueous emulsion polymerization in process in which the polymerization is initiated by a saturated cyclic terpene peroxide. This application is a continuation-in-part of our copending application, Serial No. 199,910, filed December 8, 1950, now Patent No. 2,735,870.

Since the discovery that rubber-like polymers of improved quality are produced by polymerizations conducted at temperatures below normal room temperature, numerous polymerization formulations and procedures have been developed for use in low temperature aqueous emulsion polymerization processes. In general, while the employment of the low temperature reaction improves the polymer quality, in many cases it is attended by disadvantages, such as a lowered reproducibility, lowered rate of reaction, increased induction time, and the like.

A primary object of the present invention is to provide an improved process for the polymerization of unsaturated organic compounds, which process is particularly applicable to the low temperature process of producing synthetic rubber. A further object is to provide an improved method of causing unsaturated organic compounds to polymerize in a reproducible manner and at a relatively rapid rate at a relatively low temperature in an aqueous emulsion. Other objects and advantages of the invention will be apparent from the following description and claims.

We have now discovered that a process of polymerizing unsaturated organic compounds in the presence of an organic peroxide, particularly when the polymerization is conducted in an aqueous emulsion redox formulation containing the peroxide as an oxidizing agent, is materially improved, particularly in the rate and reproducibility of the polymerization reaction, when the peroxide used is a saturated cyclic terpene peroxide.

In general, in accordance with this invention, polymerizable unsaturated organic compounds are polymerized by mixing them with saturated cyclic terpene peroxides and decomposing the peroxides to form free radicals.

Our copending application, Serial No. 199,910, filed December 8, 1950, Patent No. 2,735,870, describes and claims saturated cyclic terpene peroxides and processes for their production. Both the peroxides and oxidates of saturated cyclic terpene hydrocarbons produced in accordance with the process of our copending application comprise saturated cyclic terpene peroxides suitable for employment in the process of the present invention. The oxidates are solutions in which the solvent consists essentially of saturated cyclic terpene hydrocarbons, and the solute consists essentially of the predominant hydroperoxy products produced in situ by oxidizing the solvent saturated cyclic terpene hydrocarbons, in liquid phase, with gaseous oxygen, until the solvent contains at least about 20% by weight of saturated cyclic terpene peroxides.

As used herein, the term peroxides is generic and includes hydroperoxides. The term saturated cyclic terpenes refers to compounds which, structurally, are obtainable from cyclic terpenes by the saturation of their double bonds and to mixtures of such compounds with inert substances, without regard to the particular method of starting material used to produce the mixture. Saturated cyclic terpene radical names produced by replacing "e" with "yl", e. g. pinanyl from pinane, refer to monovalent radicals formed by the removal of any hydrogen atom from the hydrocarbon.

The peroxides produced by the process of our copending application are principally hydroperoxides. When they are produced from saturated monocyclic terpenes, they have the empirical formula $C_{10}H_{19}OOH$, and when they are produced from saturated bicyclic terpenes they have the formula $C_{10}H_{17}OOH$. The following schematic formulas are illustrative of the structures of particularly valuable mono- and bicyclic saturated terpene hydroperoxides:

The saturated cyclic terpene hydrocarbon oxides can be concentrated by any of the conventional methods. For example, a low pressure carrier gas distillation to strip off the unoxidized hydrocarbon leaving the peroxide as a residue, a low pressure vacuum distillation of the peroxide, or a precipitation of the hydroperoxide as the sodium salt, are satisfactory methods for the isolation of the saturated cyclic terpene hydroperoxides.

The oxidates are excellent starting materials for the preparation of substantially pure saturated cyclic terpene hydroperoxides. Simple removal of the unoxidized hydrocarbon by suitable distillation, such as a low pressure steam distillation, usually leaves substantially pure hydroperoxides as the residue. Since some non-volatile oxygenated by-products may be produced, particularly in the latter stages of oxidation, oxidates containing only about 30 to 60% hydroperoxides are generally preferred for the preparation of the substantially pure hydroperoxides by distillation methods. Other methods of concentration, such as precipitation of the hydroperoxide as the sodium salt or extraction of the hydroperoxide from the oxidate with aqueous or alcoholic base and subsequent regeneration of the hydroperoxide from the salt, may also be applied to oxidates prepared by our process.

Monomers suitable for polymerization in accordance with the process of this invention comprise polymerizable unsaturated organic compounds capable of being dispersed in an aqueous emulsion. In general, such unsaturated organic compounds contain not more than about 10 carbon atoms and are characterized by the presence of at least one $CH_2=C<$ group attached to electronegative groups such as halogen atoms, or vinyl, acetylenic, phenyl, nitrile, carboxy, or the like groups. Illustrative examples of suitable unsaturated compounds include conjugated butadienes such as butadiene, 3-methoxy-1,3-butadiene, and the like; haloprenes such as chloroprene, bromoprene, and the like; alkenyl aromatic hydrocarbons such as styrene, vinyl, naphthalene, and the like, acrylic and substituted acrylic esters and their nitriles, amides, and the like, such as acrylic acid, methyl methacrylate, acrylonitrile, methacrylamide, and the like; methyl vinyl ketone, vinyl acetate, and the like; and mixtures thereof. Mixtures of polymerizable aliphatic conjugated diolefins, such as butadiene, with copolymerizable vinyl aromatic hydrocarbons, such as styrene, are preferred starting materials; especially when the mixtures contain about 1 to 10 parts by weight diolefin per part by weight of aromatic hydrocarbon.

Polymerizations conducted in accordance with the present invention can be conducted in bulk or in solutions, dispersions, or suspensions in the usual organic or aqueous liquid solvents or reaction medium. Illustrative examples of suitable liquids include hydrocarbons such as the pentanes, hexanes, benzene and the like; substituted hydrocarbons such as nitrobenzene, chlorobenzene and the like; and aqueous solutions, dispersions and emulsions having a pH of from about 6 to 12.

The polymerization reactions can be conducted under normal or superatmospheric pressure; and are preferably conducted in a neutral atmosphere such as a nitrogen atmosphere. The reactions can be conducted at temperatures ranging from relatively low temperatures which are slightly above the freezing point of the reaction mixture, particularly where a redox formulation is used, to relatively high temperatures which are slightly below the decomposition temperature of the monomers or polymers, or temperatures at which the rate of decomposition of the peroxides becomes unduly rapid. In general, temperatures ranging from about $-10$ to $130°$ C. can be used, and where aqueous emulsion redox formulations are used, temperatures ranging from about $0$ to $10°$ C. are preferred.

The process of this invention is particularly adapted for the copolymerization of monomers comprising mixtures of aliphatic diolefins and vinyl aromatic hydrocarbons in an aqueous emulsion redox formulation comprising water, a reducing agent or activator, an emulsifying agent, a modifier, and the organic peroxide.

In general, the reducing agent or activator can comprise any of the usual activators consisting of one or more compounds which produce a standard oxidation potential of below about minus 0.3 volt. Illustrative examples of suitable activators include the polyamino compounds such as hydrazine, ethylenediamine, tetraethylenepentamine and mixtures of such polyamino compounds with other activator compounds; soluble compounds containing ions of metals such as iron, cobalt, manganese, copper, vanadium, and the like present in both a high and low valence state, such as aqueous mixtures containing $FeSO_4$, and $Na_4P_2O_7$ or the sodium or potassium complex salts thereof, and mixtures of such compounds with other activator compounds; and mixtures of metal ion containing compounds with reducing sugars such as dextrose, threose, glucose, and the like. Activators of the low sugar or sugar-free type containing ferric and ferrous ions are preferred.

The amount of the activator can be varied widely depending upon the particular activator and the other components of the polymerizing mixture; but, in general, from about 0.1 to 5 parts per hundred parts of monomer can be used.

The emulsifying agent can comprise substantially any of the emulsifying agents usually used in aqueous emulsion polymerizations. Illustrative examples of suitable emulsifying agents include the alkali metal salts of the higher fatty acids, or the rosin acids, and the like, or the non-ionic emulsifying agents, such as the alkyl or aromatic sulfonates, and the like. The alkali metal salts of the rosin acids and the chemically modified rosin acids are preferred.

The amount of the emulsifying agent can be varied from about 0.5 to 15% based on the total weight of the aqueous emulsion; but the use of from about 1 to 3% is preferred.

The modifier can be one or more of the primary, secondary, or tertiary mercaptans usually used to modify polymerization reactions. The use of the tertiary mercaptans is preferred.

The amount of the modifier can be varied from about 0.1 to 1.0% based on the weight of the monomers; but the use of from about 0.2 to 0.5% is preferred.

In conducting the polymerization, the components of the polymerization reaction, consisting essentially of water, an activator, an emulsifying agent, the monomers, a reaction modifier, and the saturated cyclic terpene peroxide can be mixed in substantially any order. It is generally preferable, particularly in a batchwise or semibatchwise process, to first charge the reaction vessel with an aqueous medium into which the activator has been incorporated, then add the monomers, so that the peroxide, which can be added along with the monomers, is the last reactant introduced into the reaction vessel.

The various additives and modifying susbtances usually employed in emulsion polymerization reactions can be employed in polymerizations conducted in accordance with the present invention using the amounts usually used, for the usual purposes. Where it is desirable to polymerize at temperatures below $0°$ C., water soluble substances, such as inorganic salts and alcohols, glycols and the like can be used to lower the freezing point of the aqueous medium. Suitable water soluble substances include methyl or ethyl alcohol, ethylene, glycol, and the like.

The following examples are illustrative of the invention.

Variations in emulsifiers, modifiers, and activators used in emulsion copolymerizations may alter the rate of conversion obtained with a given peroxide. The saturated cyclic terpene peroxides were compared with other peroxides by holding all other variables constant and running the polymerizations at the same time in identical reactors.

The formulations used in the examples below are standard recipes for production of the so-called cold rubber at $5°$ C. using cumene hydroperoxide (CHP) and di-isopropyl benzene monohydroperoxide (DIBP) as the peroxides. As will be apparent to those skilled in the art, these formulations are not necessarily the optimum, and many variations in the recipes or formulations as well as the polymerization temperature may be made without departing from the spirit and scope of our invention.

The general recipe used in the following examples of emulsion polymerizations was:

| Ingredient: | Parts |
|---|---|
| Butadiene | 71.5 |
| Styrene | 28.5 |
| Mercaptan modifier | 0.2 |
| Rosin type soap | 4.7 |
| Water | 180 |
| Activator | Varied |
| Peroxide | Varied |

The emulsion polymerization were conducted in glass bottles at $5°$ C. using 50 grams of monomers and maintaining vigorous agitation of the emulsion by continuous endwise rotation of the bottles. In each case a mixture of the peroxide with the butadiene and styrene was cooled to about $5°$ C. and mixed with a mixture of water, the rosin soap, the modifier and the activator which had been previously prepared and cooled to about $5°$ C. Aliquots were withdrawn at suitable intervals for determination of the percent conversion of monomers to polymer by conventional methods.

*Example 1*

In order to demonstrate the variation of the activity of hydroperoxides as polymerization catalysts with the variation in the number of double bonds in the hydroperoxide molecule, peroxides derived from terpenes and containing 3, 2, 1 and no double bonds were used as the catalyst in the above formula using a standard low-sugar iron activator (FeSO₄7H₂O, 0.12 part, W₄P₂O₇, 1.107 parts and Cerelase 1.0 part, per 100 parts of monomers). DIBP was also used in the same formula for comparison. In all cases 0.3 millimole of peroxide was used per 100 grams of monomers.

Conversion of monomers to polymer as determined after 10 hours was

| Peroxide of— | Double bonds | Conversion Percent, 10 hours |
|---|---|---|
| p-cymene | 3 | 25 |
| limonene | 2 | 18 |
| beta-pinene | 1 | 3 |
| p-menthane | 0 | 64 |
| DIBP | 3 | 47 |

*Example 2*

A concentrate of p-menthane hydroperoxide (MHP) containing 59 percent of MHP by weight prepared by the method of our copending application was used as the catalyst in the low-sugar iron activated formula described in Example 1 using 0.05 part by weight of peroxide per 100 parts of monomers. A commercial sample of CHP containing 68 percent by weight of the peroxide and a commercial sample of DIBP containing 50 percent by weight of the peroxide were used as the catalyst in the same formula at the same peroxide concentration for comparative purposes. Conversions determined at 4 hour intervals were:

| Peroxide | Conversion, percent | |
|---|---|---|
| | 4 hours | 8 hours |
| MHP | 66 | 81 |
| CHP | 31 | 41 |
| DIBP | 49 | 49 |

*Example 3*

Pinane hydroperoxide (PHP) was used as the catalyst in the general recipe with the low-sugar iron activator described in Example 1. DIBP was used in the same formula for comparative purposes. The amount of pure hydroperoxide charged in each case was 0.06 part by weight per 100 parts of monomers. The conversions determined at 4 hour intervals were:

| Peroxide | Conversion, Percent | | |
|---|---|---|---|
| | 4 hours | 8 hours | 12 hours |
| PHP | 43 | 71 | 81 |
| DIBP | 46 | 55 | 57 |

*Example 4*

Pinane hydroperoxide (PHP) was used as the catalyst in the general formula with a sugar-free iron activator (FeSO₄7H₂O, 0.12 part, and K₄P₂O₇, 0.107 part, per 100 parts of monomer). As in the preceding examples DIBP was used in the same formula for comparative purposes. Two concentrations of peroxides were used. The concentrations used and the conversion at 4 hour intervals were:

| Peroxide | Parts | Conversion, percent | | |
|---|---|---|---|---|
| | | 4 hours | 8 hours | 12 hours |
| PHP | 0.06 | 38 | 63 | 75 |
| PHP | 0.07 | 38 | 66 | 83 |
| DIBP | 0.06 | 15 | 17 | 17 |
| DIBP | 0.07 | 29 | 32 | 33 |

*Example 5*

Concentrates of pinane hydroperoxide (PHP—50%) and (PHP—87%) prepared by the method of our copending application, were used, in comparison with a commercial sample of di-isopropyl benzene monohydroperoxide (DIBP—50%) as the catalyst in the above formulation, using an amine activator (tetraethylenepentamine, 0.20 part per 100 parts of monomer). The peroxide concentrates were employed in amounts providing about 0.15 part of peroxide per 100 parts of monomer.

| Peroxide | Conversion, percent | |
|---|---|---|
| | 8 hours | 12 hours |
| PHP-50% | 53 | 67 |
| PHP-87% | 60 | 71 |
| DIBP-50% | 59 | 64 |

*Example 6*

Samples of styrene containing 1% by weight of the indicated peroxides were thermally polymerized by heating them at 100° C. for the indicated times. The efficiency of the peroxides were compared on the basis of how much the physical properties of the so-heated mixtures differed from those of the initial mixture of pinane, hydroperoxide, and styrene (referred to as I).

| Activator | Appearance after heating at 100° C. for— | | |
|---|---|---|---|
| | 60 min. | 100 min. | 200 min. |
| Pinane hydroperoxide | More viscous than (I). | Very much more viscous than (I). | Hard, clear, solid. |
| Tertiary butyl hydroperoxide | Less viscous than (I). | More viscous than (I). | Rubbery mass. |

We claim:
1. In a process of polymerizing polymerizable unsaturated organic compounds by mixing them with an organic peroxide and decomposing a peroxide to form free radicals, improvement which comprises employing as the organic peroxide a saturated cyclic terpene peroxide.
2. In a process of polymerizing polymerizable unsaturated organic compounds by mixing them with an organic peroxide and thermally decomposing the peroxide to form free radicals, the improvement which comprises employing as the organic peroxide a saturated cyclic terpene peroxide.
3. In a process of polymerizing polymerizable unsaturated organic compounds by reacting them with an aqueous emulsion redox formulation containing an organic peroxide as an oxidizing agent, the improvement which comprises employing as the organic peroxide a saturated cyclic terpene peroxide.
4. The process of claim 3 in which the polymerization is conducted at from about 0 to 10° C.
5. In a process of polymerizing a mixture of polymerizable conjugated aliphatic diolefins and vinyl aromatic hydrocarbons by reacting the hydrocarbons with an aqueous emulsion redox formulation containing an organic peroxide as an oxidizing agent, at a temperature of from about 0 to 10° C., the improvement which comprises employing as the organic peroxide a saturated cyclic terpene peroxide.
6. The process of claim 5 in which the redox formulation contains a sugar-free ferric and ferrous ion containing activator.
7. The process of claim 5 in which the redox formulation contains a low sugar ferric and ferrous ion containing activator.
8. The process of claim 5 in which a saturated cyclic terpene oxidate containing at least 20% saturated cyclic terpene peroxides is employed as the organic peroxide.

9. The process of claim 5 in which 2-pinanyl hydroperoxide is employed as the organic peroxide.

10. The process of claim 5 in which paramenthane hydrogen peroxide is employed as the organic peroxide.

11. The process of claim 5 in which the mixture of polymerizable hydrocarbons is a mixture of butadiene and styrene predominating in butadiene.

12. In a process of polymerizing styrene by mixing it with an organic peroxide and decomposing the peroxide to form free radicals the step of employing as the organic peroxide a saturated cyclic terpene peroxide.

13. The process of claim 12 in which the polymerization is conducted at a temperature of about 100° C.

References Cited in the file of this patent

Fisher et al.: Ind. and Eng. Chem., vol. 43, No. 3, March 1952, pages 671–674.

Cooper Chemical Society Journal, April 1953, pages 1267–1271.